(12) United States Patent
Shagam (10) Patent No.: US 6,205,529 B1
(45) Date of Patent: *Mar. 20, 2001

(54) METHOD AND APPARATUS FOR DEFRAGMENTING A STORAGE DEVICE USING A COPY FUNCTION IN THE DEVICE CONTROL LOGIC

(75) Inventor: Eli Shagam, Brookline, MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,973

(22) Filed: Sep. 25, 1997

(51) Int. Cl.[7] .................................................. G06F 12/02
(52) U.S. Cl. ............................ 711/170; 711/112; 707/206
(58) Field of Search ..................................... 711/170, 171, 711/172, 173, 112; 707/2, 205, 206; 710/22

(56) References Cited

U.S. PATENT DOCUMENTS

| | | | |
|---|---|---|---|
| 5,398,142 | 3/1995 | Davy | 360/707 |
| 5,404,511 | 4/1995 | Notarianni | 707/369 |
| 5,574,907 | 11/1996 | Jernigan, IV et al. | 707/360 |
| 5,604,902 | * 2/1997 | Burkes et al. | 707/206 |
| 5,734,861 | * 3/1998 | Cohn et al. | 711/134 |
| 5,761,680 | * 6/1998 | Cohen et al. | 707/206 |
| 5,778,392 | * 7/1998 | Stockman et al. | 707/205 |
| 5,808,821 | * 9/1998 | Davy | 360/48 |
| 5,867,733 | * 2/1999 | Meyer | 395/894 |
| 5,930,828 | * 7/1999 | Jensen et al. | 711/170 |

* cited by examiner

Primary Examiner—Do Yoo
Assistant Examiner—Gary J. Portka
(74) Attorney, Agent, or Firm—John M. Gunther; Penelope S. Wilson

(57) ABSTRACT

An apparatus for defragmenting disks by incorporating a copy function in the logic controlling a disk, so that a disk can be instructed to copy the contents of tracks from one area to another on the disk without requiring a series of data transfers between the disk and the host computer to which it is assigned. Conventional defragmentation techniques can be used to determine which files need to be defragmented and how much contiguous free space is available on the disk. Once this has been determined, the present invention enables the defragmentation program to send copy commands to the disk to cause the copy function in the logic controlling the disk to perform the data transfers, thus freeing up the host computer to perform other processing until the logic controlling the disk signals completion of the copy function's operation.

14 Claims, 14 Drawing Sheets

Copy   from   addr1 to addr2, ct nn

METHOD AND APPARATUS FOR DEFRAGMENTING A STORAGE DEVICE USING A COPY FUNCTION IN THE DEVICE CONTROL LOGIC

BACKGROUND OF THE INVENTION

1. Field of the Invention

This invention relates generally to the field of mass storage devices and more particularly to systems and methods for defragmenting mass storage devices.

2. Background

Advances in mass storage technology have considerably increased the amount of data that can be stored on individual random access magnetic disk devices used with computers. As users add files to a disk, and then update and change those files, a phenomenon known as fragmentation tends to occur in most disk storage systems, whether the disks are attached to mainframe computers, workstations, or personal computers.

Figure 4A:
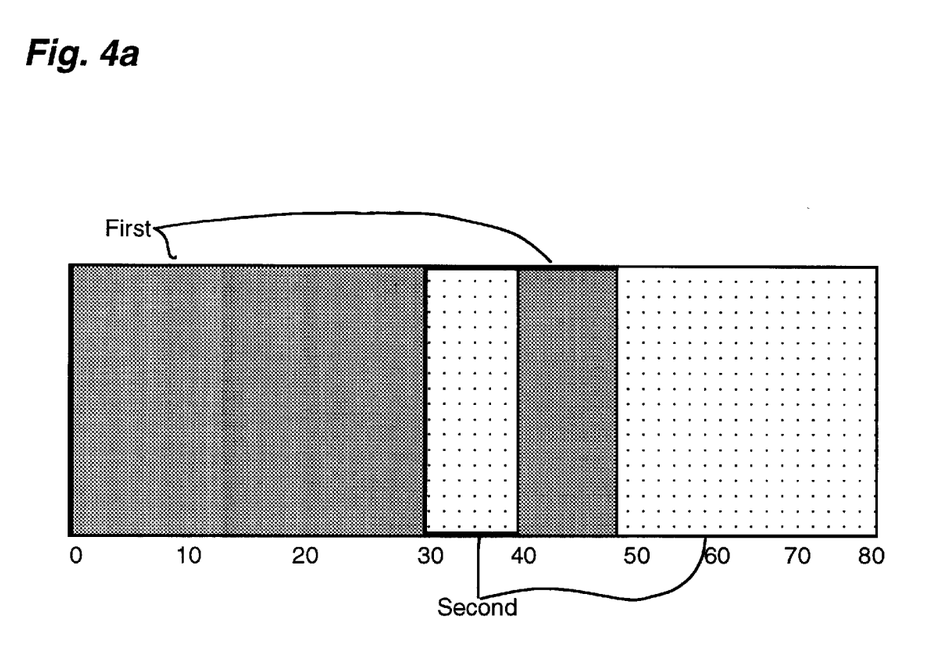
FIG. 4a is a schematic diagram showing two fragmented files.
Figure 4B:
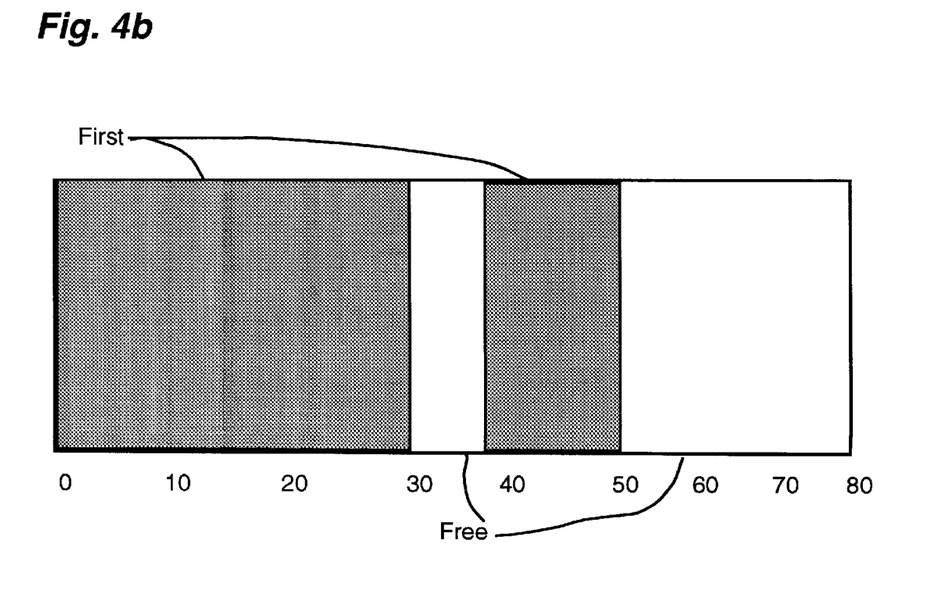
FIG. 4b is a schematic diagram showing one fragmented file.

When a file is first created, many operating systems or file systems will cause the file to be allocated to a contiguous area, such as series of tracks or cylinders on the disk in mainframe systems, or blocks in open systems, if it is possible to get a contiguous area. For illustration, as shown in the allocation map of FIG. 4a, if a simplified hypothetical disk has 80 tracks, the first file might be placed on tracks 0–30. However, if a second file is created on that disk it may be allocated at tracks 30–40. When the user wants to add data to the first file, most file systems and/or operating systems will accomplish this by allocating some additional space at another physical location on the disk for the addition, and updating pointers in the directory or volume table of contents on that disk to indicate that the first part of the file is still at tracks 0–30, but a second part has been added at tracks 40–50. When the second file needs to expand, it may be allocated space from tracks 50–80.

If the second file in this example is subsequently deleted, tracks 30–40 and 50–80 may be freed up, but the first file will still have two parts located at different sets of tracks—0–30 and 40–50. Thus, the first file has become and remains fragmented. (In this example, the second file was fragmented as well.)

Fragmentation tends to build up over time, as more files are added, deleted and modified on the mass storage system. Two problems occur as disks and files get more and more fragmented. The first, and usually more significant one, is that performance degrades when fragmented files on a fragmented disk are accessed. When a file is located in one contiguous area, it usually requires fewer seeks, or moving and repositioning of the read/write heads on the disk to find and read or write the data. As the file becomes fragmented and thus more spread out over the disk, more seeks will be needed to find a number of additional small sections or fragmented extents of the file. These additional seeks for many small fragments usually add to the time it takes to read or write or update the file. Now that disks can be not only many megabytes, but even gigabytes or greater in size, this can literally add minutes or sometimes hours to processing time, especially if all or a substantial portion of the file is being accessed.

A second problem arising from disk fragmentation is that space on the disk tends to be wasted. In the hypothetical example given above, after the second file has been deleted, there are two "holes" or empty areas free on the disk, from tracks 30–40 and from 50–80—a total of about 40 tracks. However, depending on the operating system and file system in use, a new file that needs 40 tracks might not be allocated to this disk, even though 40 tracks are free, simply because they are not contiguous. Many file systems will allow the user to indicate to which disk a file should be allocated—another way in which files may become fragmented when they otherwise might not if the user repeatedly selects an already fragmented disk.

One way to address the problem, at least in some filesystems, is to increase the initial allocation size for each file. For example, making all allocations at least 4 megabytes in size. Some filesystems will permit this, while others, such as some personal computer systems may make this difficult or impossible for a user to do.

Figure 5:
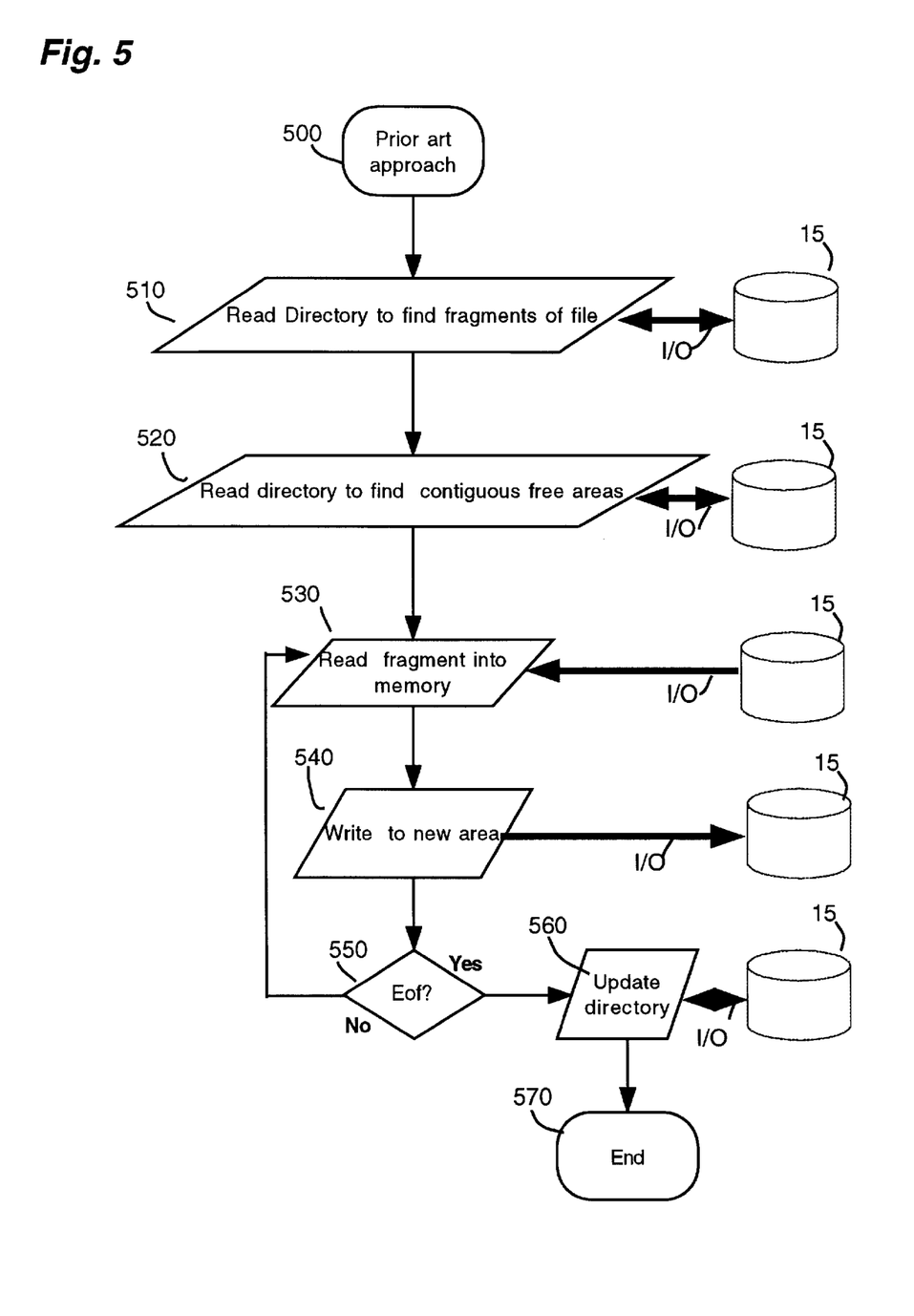
FIG. 5 is a flow diagram of the prior art.

Software programs known as defragmentation programs have also been written to address these problems. In the flow diagram of FIG. 5, a prior art approach with a defragmentation program operating in a host computer is shown. As noted there, a conventional defragmentation program reads the directories or volume table of contents on a disk (at step 510) in a mass storage system connected to that host to locate files that have significant fragmentation. Generally speaking, a defragmentation program finds or frees up enough space on the same disk for those files, and then writes them back out from the host computer's memory to a contiguous area on the selected disk(s). (See steps 520–560). Since each fragmented file is read from the disk into the host computer and then written back out to disk in the loop shown at steps 530 to 550, it can be seen that as the files and disks get larger, this may take longer and longer to accomplish. Also in FIG. 5, the darkened arrows I/O indicate the transfer of data between the host computer and a disk 15. As can be seen with this prior art approach, the loop at steps 530–550, can involve a significant number of I/O transfers between the host computer and the disk. Even in small personal computer systems, these I/O requests to read in and then rewrite all fragments may be slowed down by competing requests for other disks or devices on the same bus as the disk that is being defragmented.

Whether the defragmentation program handles only a file or even a fragment at a time, it will read the file or fragment into the host computer over a bus, then write it out from the host computer over a bus to the disk. Thus, although defragmentation programs help return mass storage systems to optimal performance, they may also create risk. If the system crashes while the program is reading and writing a file or fragment back out to disk, one or more files could be corrupted. Thus, the longer it takes for the defragmentation program to run, the greater is the risk that unexpected occurrences may cause a system failure or crash. As the size of the files being defragmented increases, more time is spent reading the files into the host computer and writing them back out to the disk. Thus, defragmenting larger files takes more elapsed time due to the number of I/O transfers to and from the host and may also increase the risk of file corruption in the event of a system failure. Many defragmentation programs attempt to minimize this risk by not allocating the new, defragmented file, until the whole operation is complete and error-free. While this tends to minimize the risk of corruption, if the system crashes before defragmentation is complete, minutes or hours of time could still be wasted by the conventional approach of defragmentation programs.

One attempt to avoid fragmentation is used by some database programs that allocate very large areas of contiguous space to a database file when the file is first created. While this tends to minimize the performance problem, it does waste space. And it is typically limited to sophisticated database application programs. Most other types of files, on most computer systems, whether large or small, tend to be subject to file fragmentation over time.

It is an object of this invention to minimize the need to transfer fragmented file data from a disk into a host computer and back to the disk again.

It is another object of the present invention to improve the performance of defragmentation operations.

SUMMARY OF THE INVENTION

The present invention incorporates a copy function in the logic controlling a disk, so that a disk system can be instructed to copy the contents of tracks from one area to another on the disk without requiring a series of data transfers between the disk and the host computer to which it is assigned. Conventional defragmentation techniques can be used to determine which files need to be defragmented and how much contiguous free space is available on the disk. Once this has been determined, the present invention enables the defragmentation program to send copy commands to the disk to cause the copy function in the logic controlling the disk to effectuate the data transfers, thus freeing up the host computer to perform other processing until the logic controlling the disk signals completion of the copy function's operation.

DETAILED DESCRIPTION OF THE INVENTION

Figure 1A:
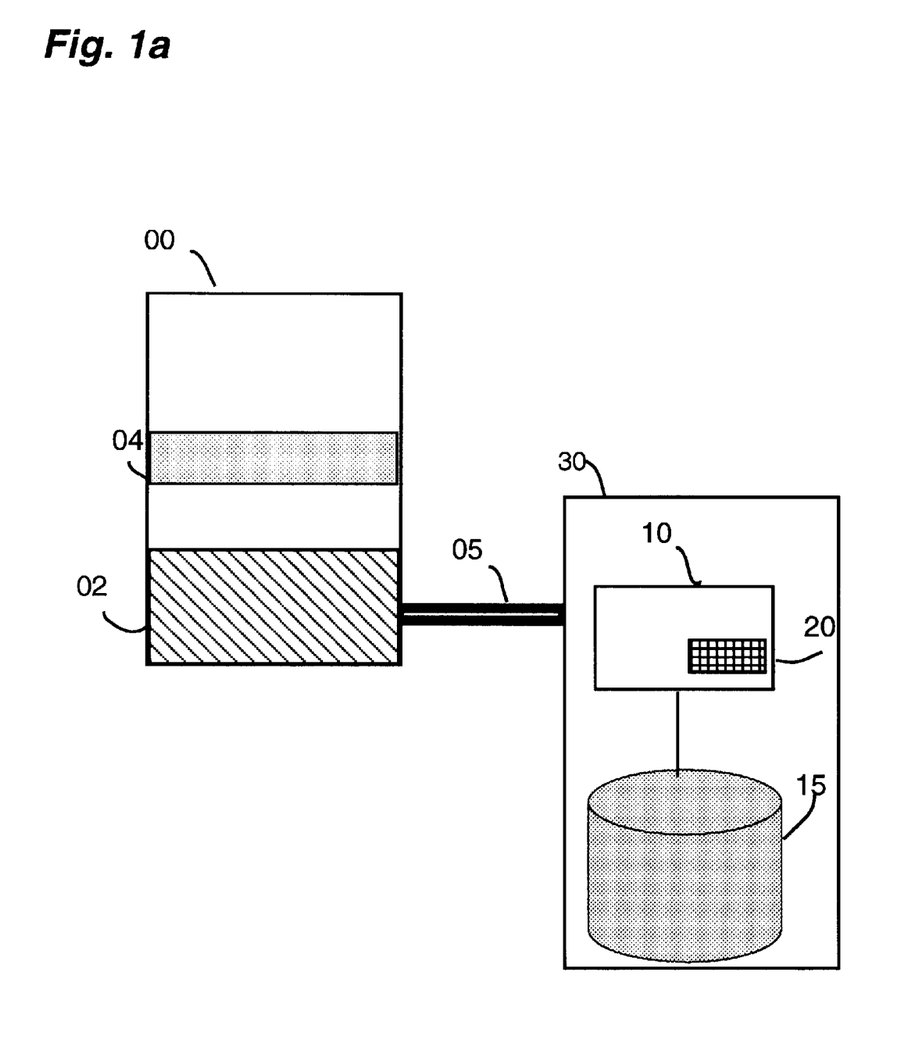
FIG. 1a is a schematic drawing of one preferred embodiment of the present invention.

In FIG. 1a, a schematic block drawing of one preferred embodiment is shown. As seen there, disk subsystem 30 is connected to bus 05, which, in turn, communicates with host 00. Host 00 is shown executing an operating system 02 and a defragmentation program 04. Disk subsystem 30, according to the method and apparatus of the present invention, includes control logic 10 for generally controlling the operation of disk 15. In this preferred embodiment, control logic 10 includes a copy function 20 as part of its logic. Copy function 20, in a preferred embodiment, is capable of copying a specified number of tracks from one physical address on disk 15 to another physical address on disk 15, without having to transfer these tracks to and from host 00. In a preferred embodiment, defragmentation program 04 supplies these addresses, together with the number of tracks to be copied, to copy function 20. As will be apparent to those skilled in the art, host 00 could be a mainframe computer system, in which case bus 05 might be a channel or channel subsystem or ESCON subsystem. Similarly, host 00 could be a workstation or a personal computer, in which bus 05 might be some form of SCSI bus interface between the host and the disk subsystem 30.

Figure 1B:
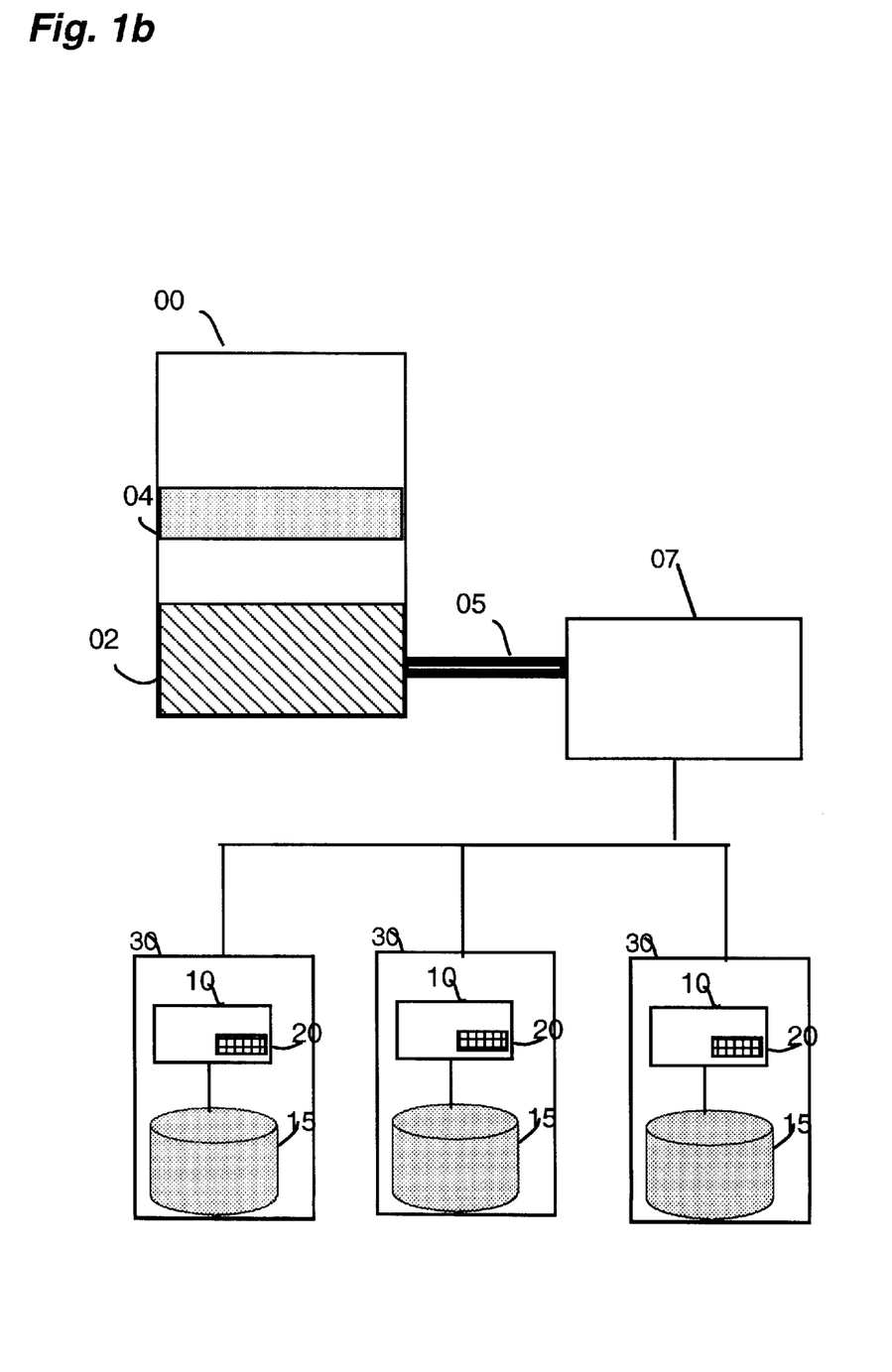
FIG. 1b is a schematic drawing of an alternative preferred embodiment of the present invention.

For mainframe computer systems or larger workstation systems, where the logic controlling disks often involves several components, a preferred embodiment, such as that shown in FIG. 1b might be used. In FIG. 1b, host 00 is connected to bus 05, which in turn, is connected to disk controller 07, which controls disk subsystems 30. In this preferred embodiment, each disk subsystem 30 includes control logic 10 with a copy function 20 and a disk 15.

Figure 3A:
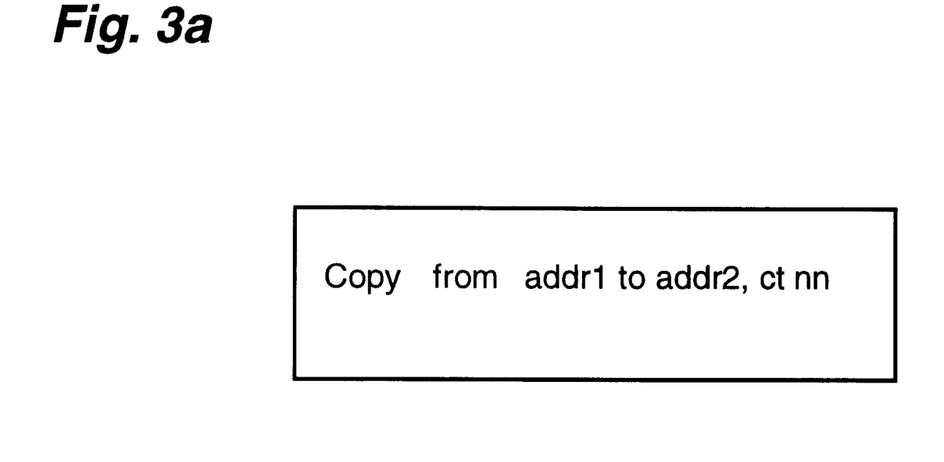
FIG. 3a is a schematic drawing showing the syntax of a copy command according to the method and apparatus of the present invention.
Figure 3B:
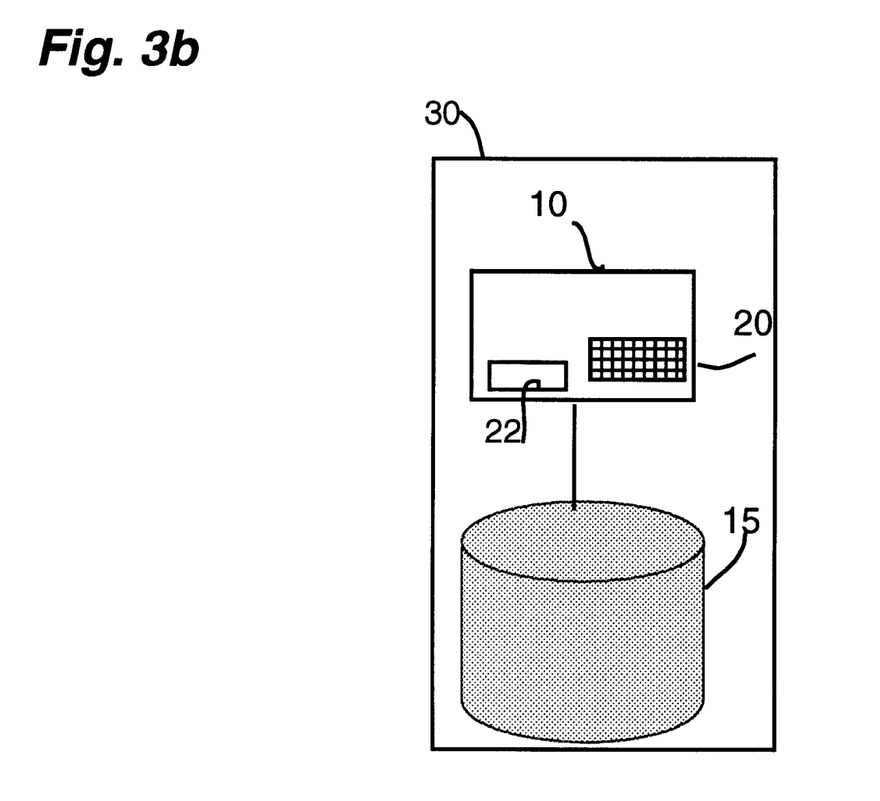
FIG. 3b is a schematic drawing showing a local level buffered implementation of a preferred embodiment of the present invention.

Turning briefly to FIG. 3b, a preferred embodiment of disk subsystem 30 is shown in which a buffer 22 is included in control logic 10. In this embodiment, buffer 22 can be used by copy function 20 to hold all or part of the data contents of the tracks being copied from one area to another on disk 15. As will be apparent to those skilled in the art, whether a buffer is needed and the size required for it, will depend on the specifications of the disks 15 being used for such matters as transfer speeds, latency times, costs, etc., as well as the design features of the controlling logic components and the other parts of the mass storage system. The preferred embodiments of the present invention use a buffer when copy function 20 is part of control logic 10 in disk subsystem 30.

Figure 1C:
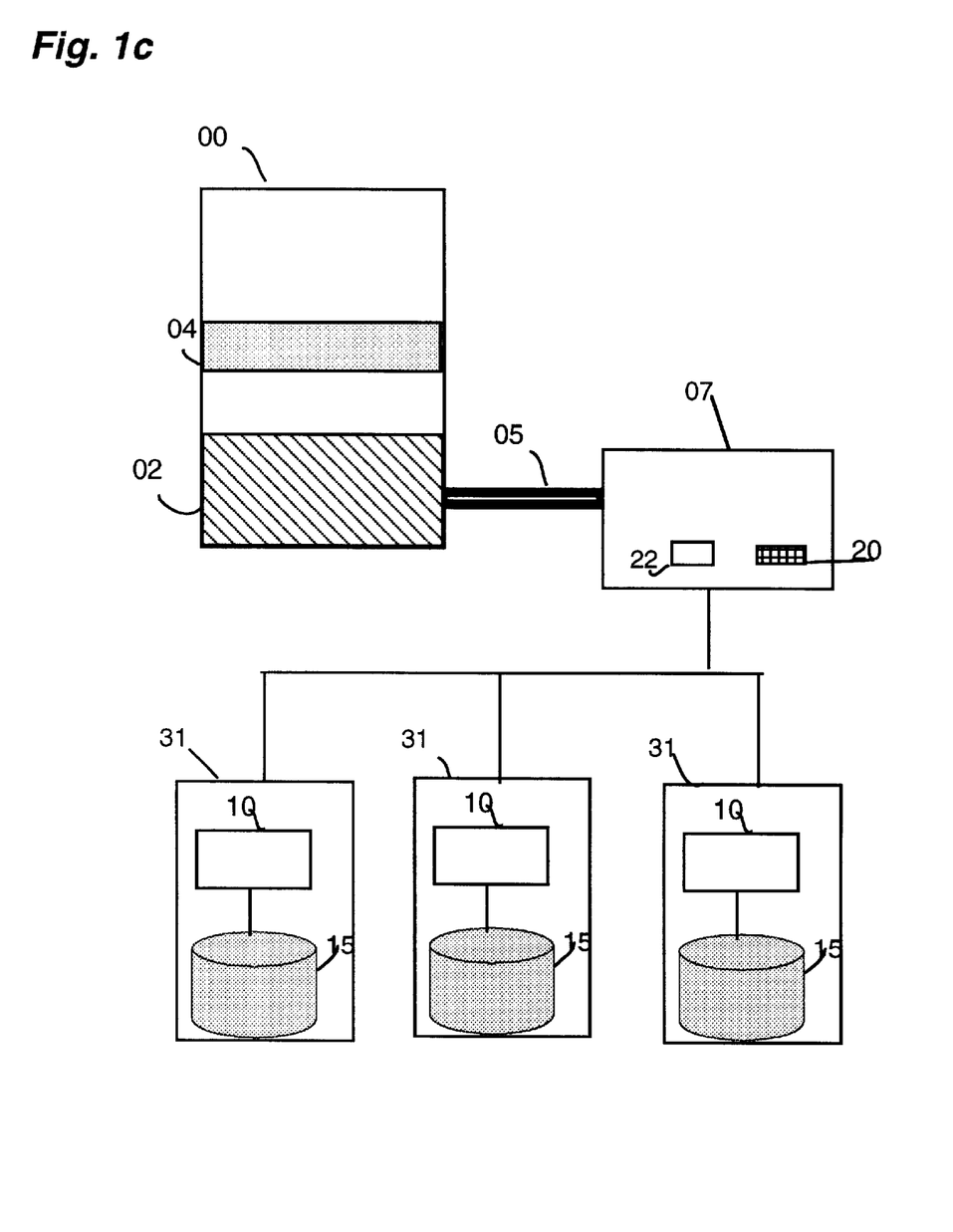
FIG. 1c is a schematic drawing of another preferred embodiment of the present invention.

Now turning to FIG. 1c, another alternative preferred embodiment is shown. Here host 00 is connected to bus 05, to which, in turn, controller 07 is connected. Controller 07, in FIG. 1c controls conventional disk subsystems 31, but controller 07 includes copy function 20 and buffer 22.

Figure 1D:
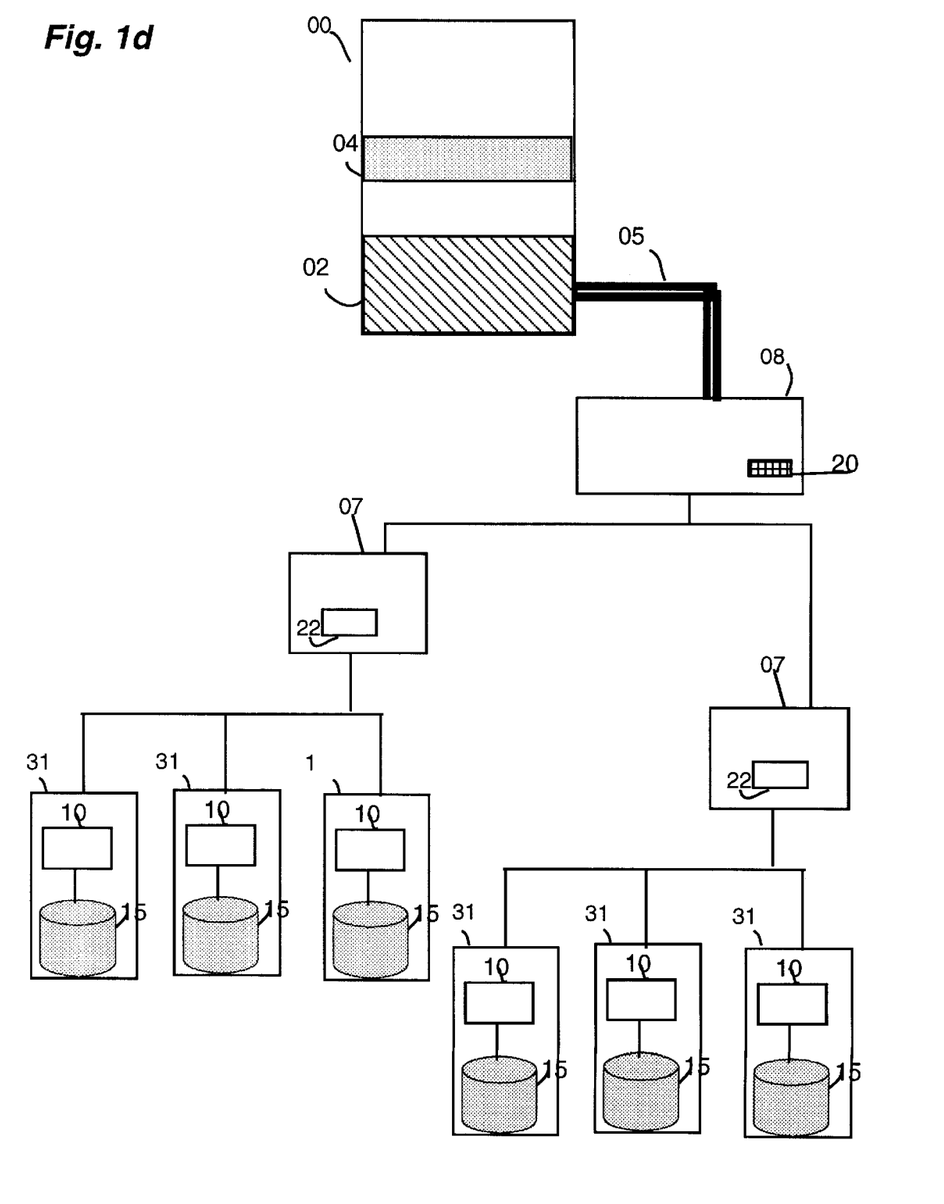
FIG. 1d is a schematic drawing of yet another preferred embodiment of the present invention.

In FIG. 1d, a more complex control scheme for disks is shown, such as might be used more typically in large mainframe computers. In FIG. 1d, host 00 is connected to bus 05 which, in turn, is connected to a disk adapter 08, which includes copy function 20. Disk adapter 08's logic controls two disk controllers 07, which, in turn control several conventional disk subsystems 31 apiece. In this preferred embodiment, buffer 22 might be located in controllers 07.

Figure 1E:
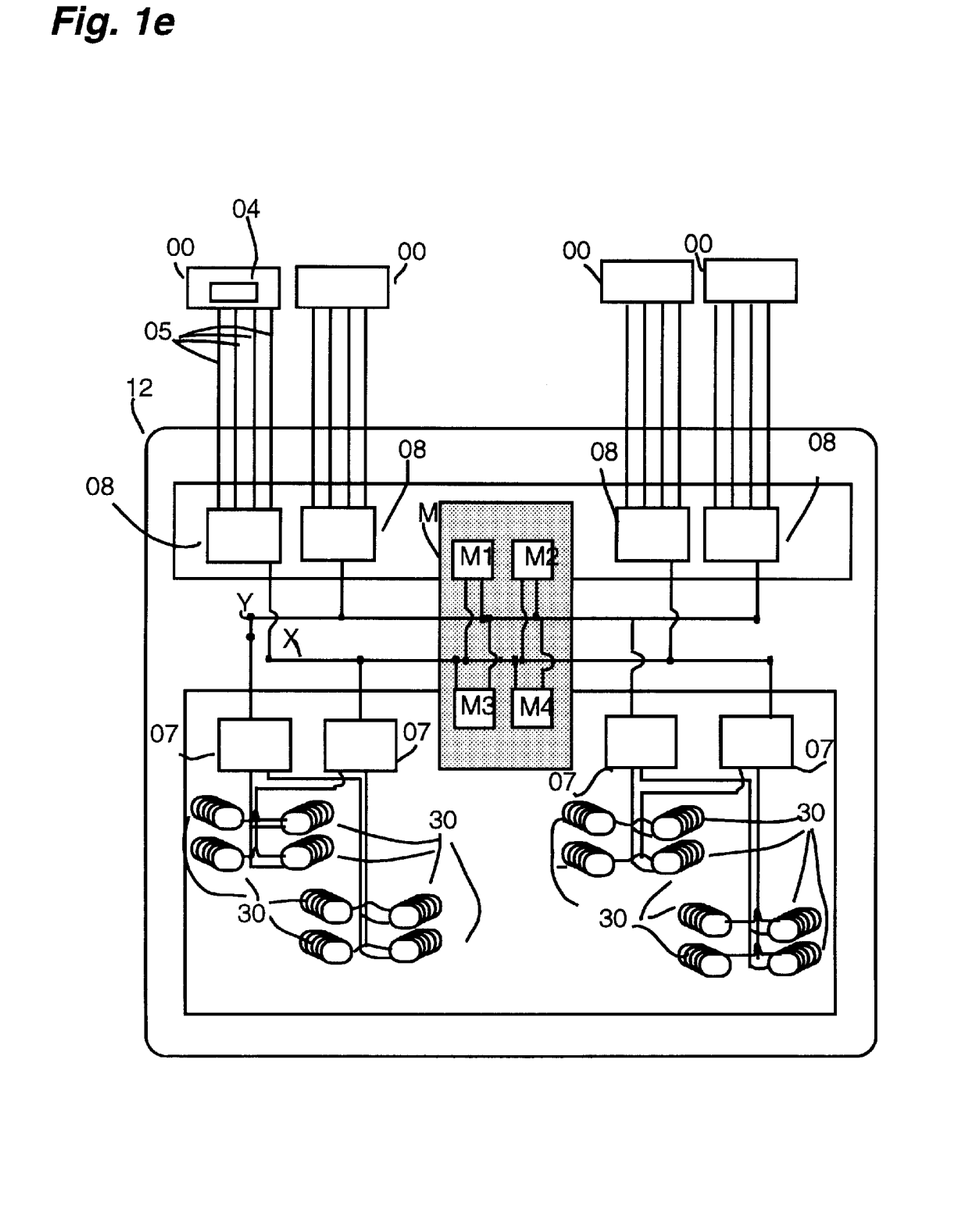
FIG. 1e is a schematic drawing of still another preferred embodiment of the present invention.

FIG. 1e shows another preferred embodiment for a large mainframe configuration. In FIG. 1e, multiple hosts 00 share a large multiple disk system 12. In this preferred embodiment, each host 00 is connected by means of one or more buses 05 to a host director 08 in multiple disk system 12. In applicant's Assignee's Symmetrix 5XXX series, a host director 08 is also connected to global shared memory M and to either internal bus X or internal bus Y. Internal bus X and internal bus Y are also connected to several disk directors 07. In this preferred embodiment, disk directors 07 are connected to a plurality of disk subsystems 30 of the present invention, such as those shown in FIG. 3b. As noted in connection with FIG. 3b, each disk subsystem 30 of the present invention includes control logic 10, copy function 20 and buffer 22, as well as disk 15. Thus, in this preferred embodiment, each individual disk 15 in multiple disk system 12 has its own copy function 20 as part of its logic.

Figure 1F:
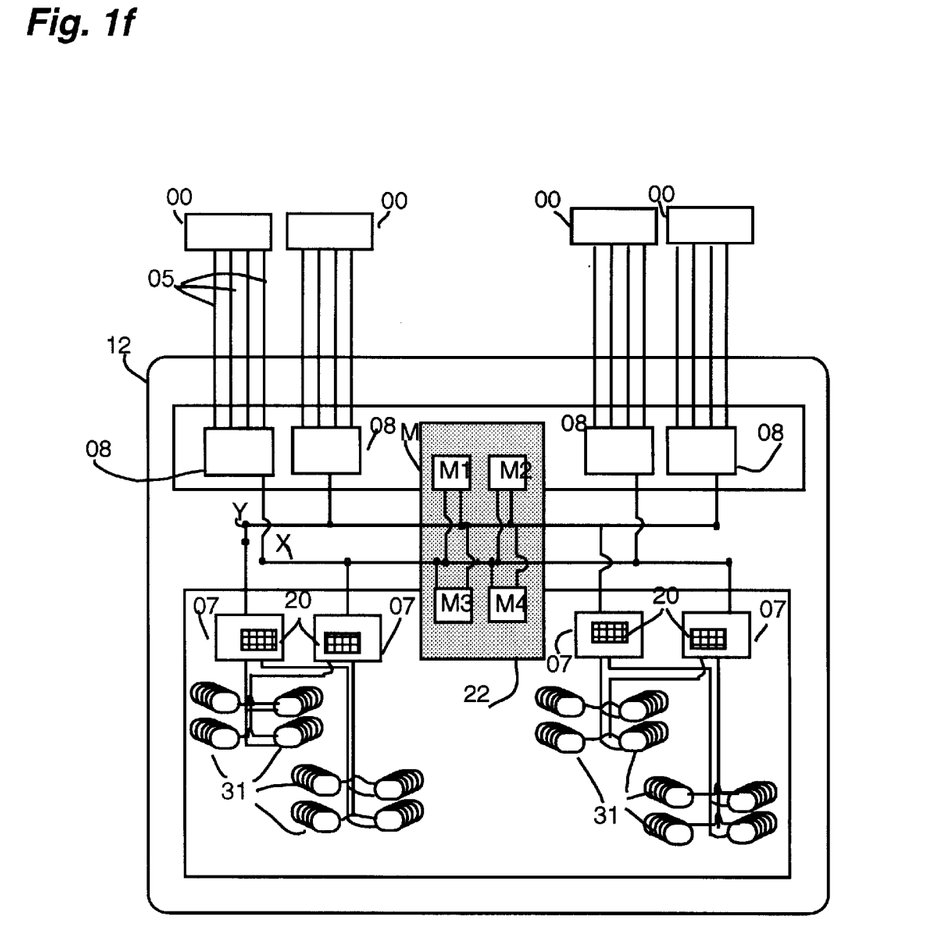
FIG. 1f is a schematic drawing of yet one more alternative preferred embodiment of the present invention.

As will be apparent to those skilled in the art, variations of this embodiment could be implemented as well, such as that shown in FIG. 1f. There multiple disk system 12 includes host directors 08 and disk directors 07, too. In FIG. 1f, however, copy function 20 is incorporated into disk directors 07, thus allowing conventional disk subsystems 31 to be used. In this preferred embodiment, buffer 22, if needed can be a specified area in global shared memory M.

Figure 1G:
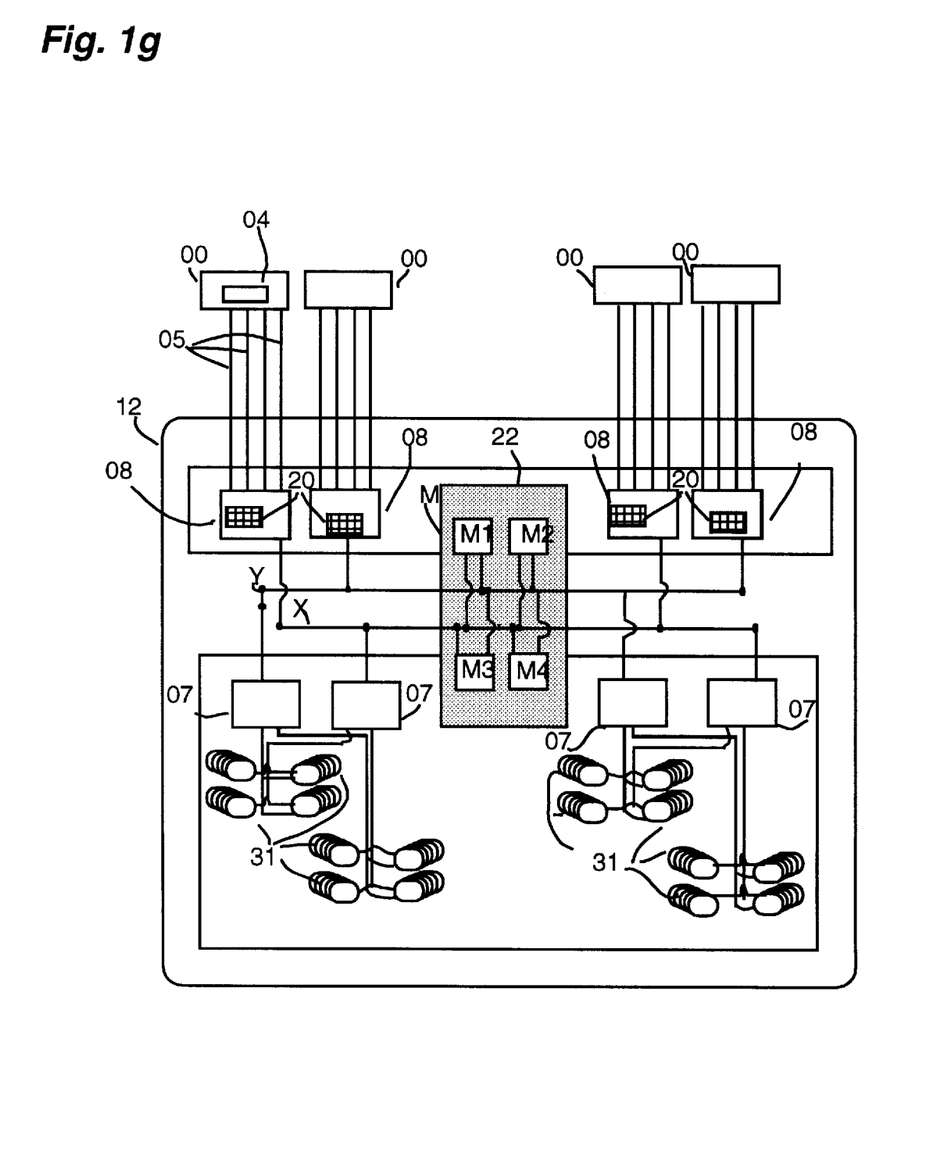
FIG. 1g is a schematic drawing of still one more alternative preferred embodiment of the present invention.

Similarly, FIG. 1g shows another alternative preferred embodiment using applicant's Assignee's Symmetrix 5XXX multiple disk system. In FIG. 1g, multiple disk system 12 is configured with copy function 20 as part of the host directors 08, again allowing the use of conventional disk subsystems 31 with disk directors 07.

Figure 4C:
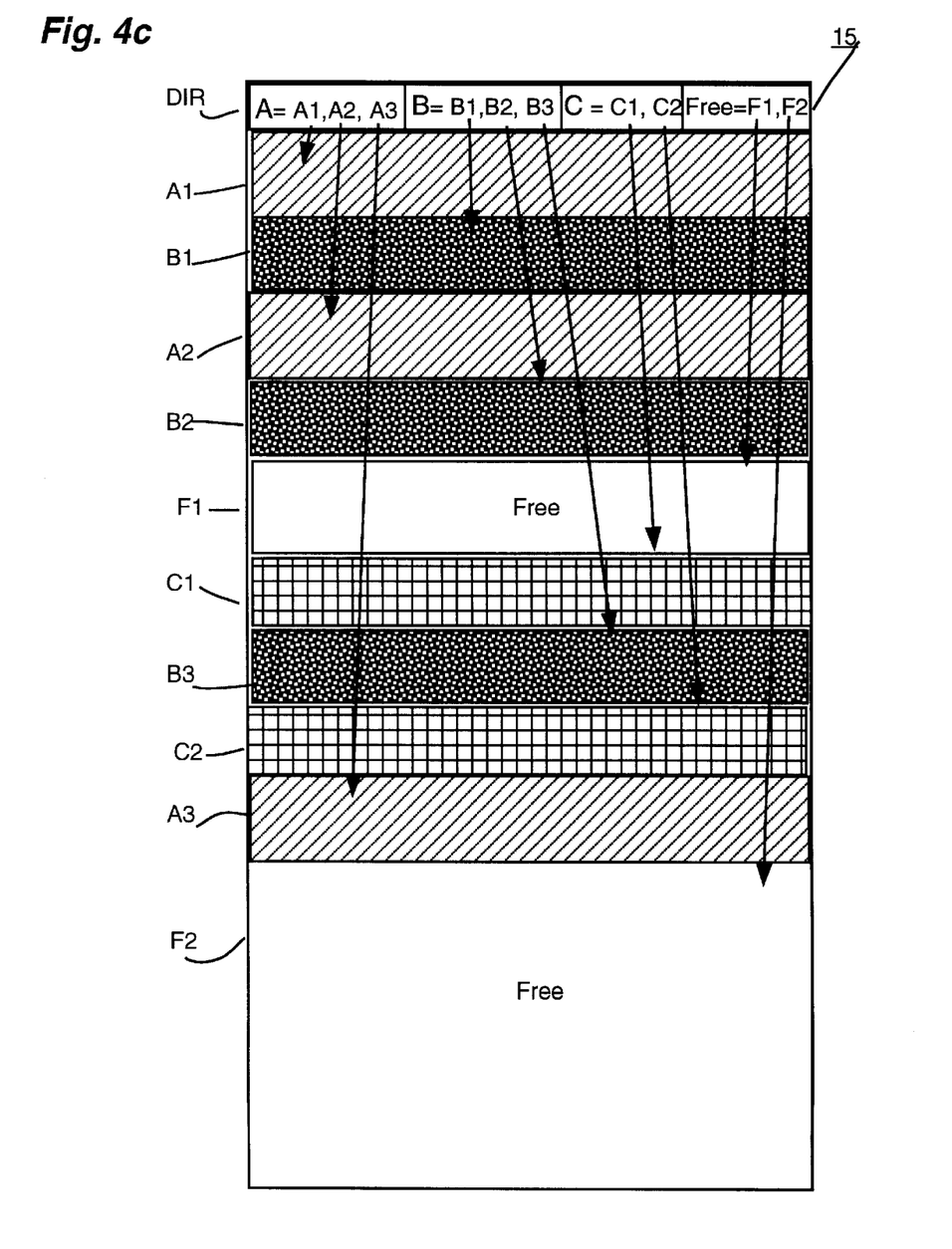
FIG. 4c is a schematic drawing of a fragmented disk.

Turning briefly to FIG. 4c, a schematic drawing of a disk with several fragmented files is shown. In FIG. 4c, the directory dir, shows there are three files, A, B and C allocated or placed on disk 15. File A is in three sections or fragments A1, A2 and A3, which are pointed to by directory dir. Those skilled in the art will appreciate that directory dir will typically 'point' to these fragments or extents of file A by using starting and ending addresses on the disk or starting address and counts indicating size. File B also comprises three fragments while file C is spread over only two fragments on the disk. In the example shown in FIG. 4c, there are only two free areas, F1 and F2 on disk 15. With heavily fragmented file systems there are usually many more free areas that are smaller in size interspersed amongst the allocated files. However, as in this example, many, if not most disks usually have at least 20% of their total area free.

Figure 2:
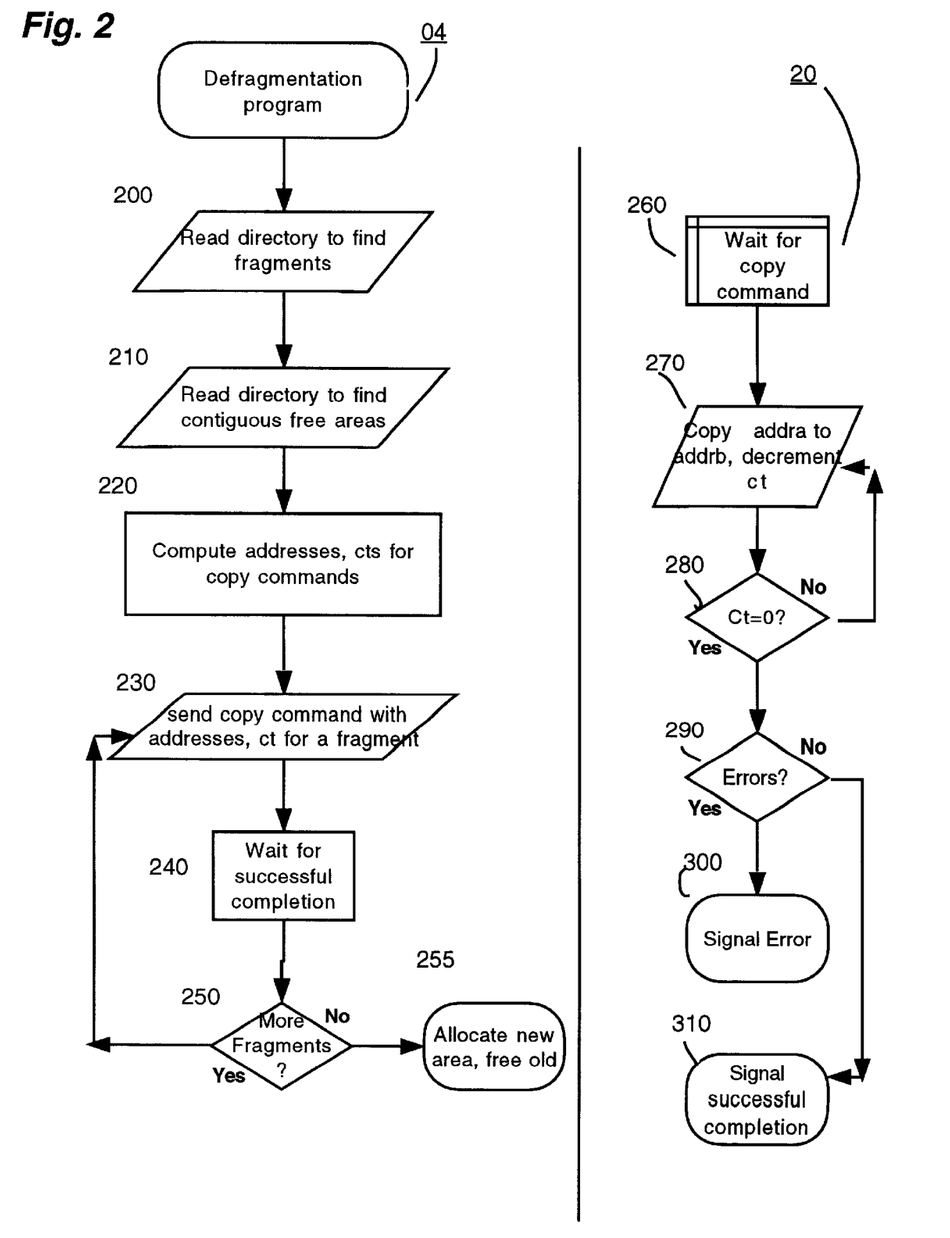
FIG. 2 is a flow diagram of the present invention.

Now turning to FIG. 2, a flow diagram of a defragmentation program 04 used in conjunction with the present invention is shown. At step 200, defragmentation program 04 reads the directory dir of a disk to find a file and its fragments. If the disk were the one shown in FIG. 4c and file A were the file in question, this step would locate the three fragments A1, A2 and A3 shown in FIG. 4c. Back in FIG. 2, at step 210, defragmentation program 04 would also read the directory dir to locate contiguous free areas large enough to hold the complete file A. Again using the disk illustrated in FIG. 4c, free area F2 would be large enough to hold all of file A.

Now back in FIG. 2 again, at step 220, a defragmentation program 04 according to the method and apparatus of the present invention would compute the addresses to be used for the copy function 20 of the invention. In the example used, this would be the starting addresses of A1, A2 and A3, and their respective sizes, as well as the starting address of free area F2. Next, at step 230, defragmentation program 04 according to the method and apparatus of the present invention would temporarily allocate a free area (F2 in the above example) on the disk to hold the new copy of file A, and send a copy command with the addresses required for the first fragment, A1, over bus 05 to copy function 20 in the logic controlling the disk containing file A. Next, in a preferred embodiment, defragmentation program 04 would wait, at step 240, for the copy function to complete copying this fragment. As will be apparent to those skilled in the art, while defragmentation program 04 is waiting, other tasks can be performed by host 00, and other devices can be accessed on bus 05, while the copy function 20 of the present invention copies this fragment.

When a successful completion has been received at step 240 in FIG. 2, defragmentation program 04 according to the present invention checks, at decision block 250 to see if there are more fragments to be copied. In the example of File A, there are, so defragmentation program 04 of the present invention loops through steps 230, 240 and 250 until there are no more fragments to be copied. At that point, at step 255, defragmentation program 04 of the present invention would permanently allocate the new area holding the defragmented file A and free the old areas A1, A2 and A3.

Still in FIG. 2, at step 260, the flow of copy function 20 is shown starting with a wait for a copy command to be sent to it. At step 270, copy function 20 copies from a first address addra, to a second address addrb and decrements a count ct accordingly. At decision block 280 the present invention checks to see if the count equals zero for this fragment. If not, the copy function goes back to step 270 to continue the copying of this fragment into the newly allocated space. If the count is zero at decision block 280, the invention checks at step 290 to see if there have been any errors. If there are, an error signal is generated at step 300. If there are no errors, copy function 20 will signal successful completion of the copy of this fragment at step 310.

Figure 4D:
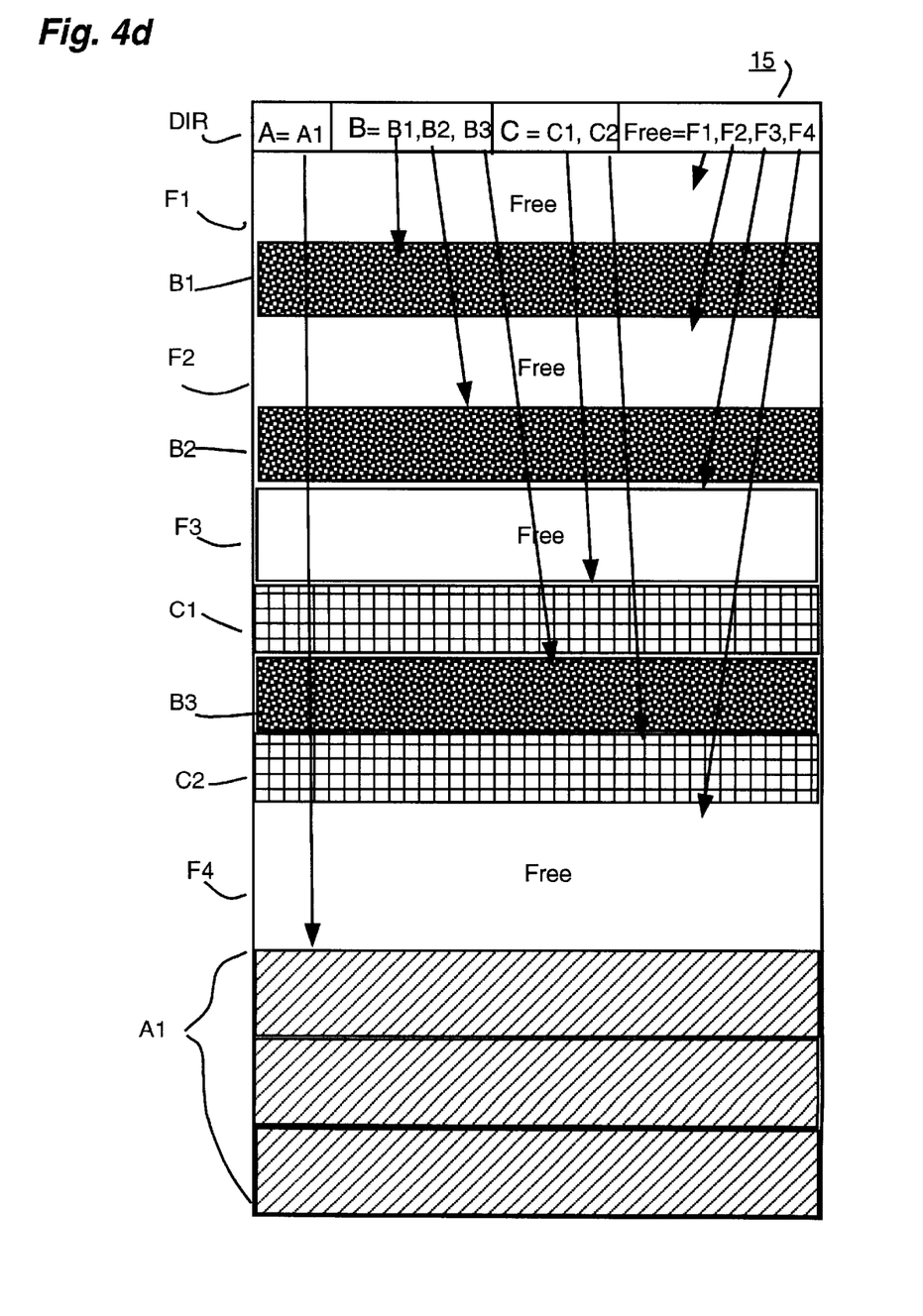
FIG. 4d is a schematic drawing of a fragmented disk after partial defragmentation.
Figure 4E:
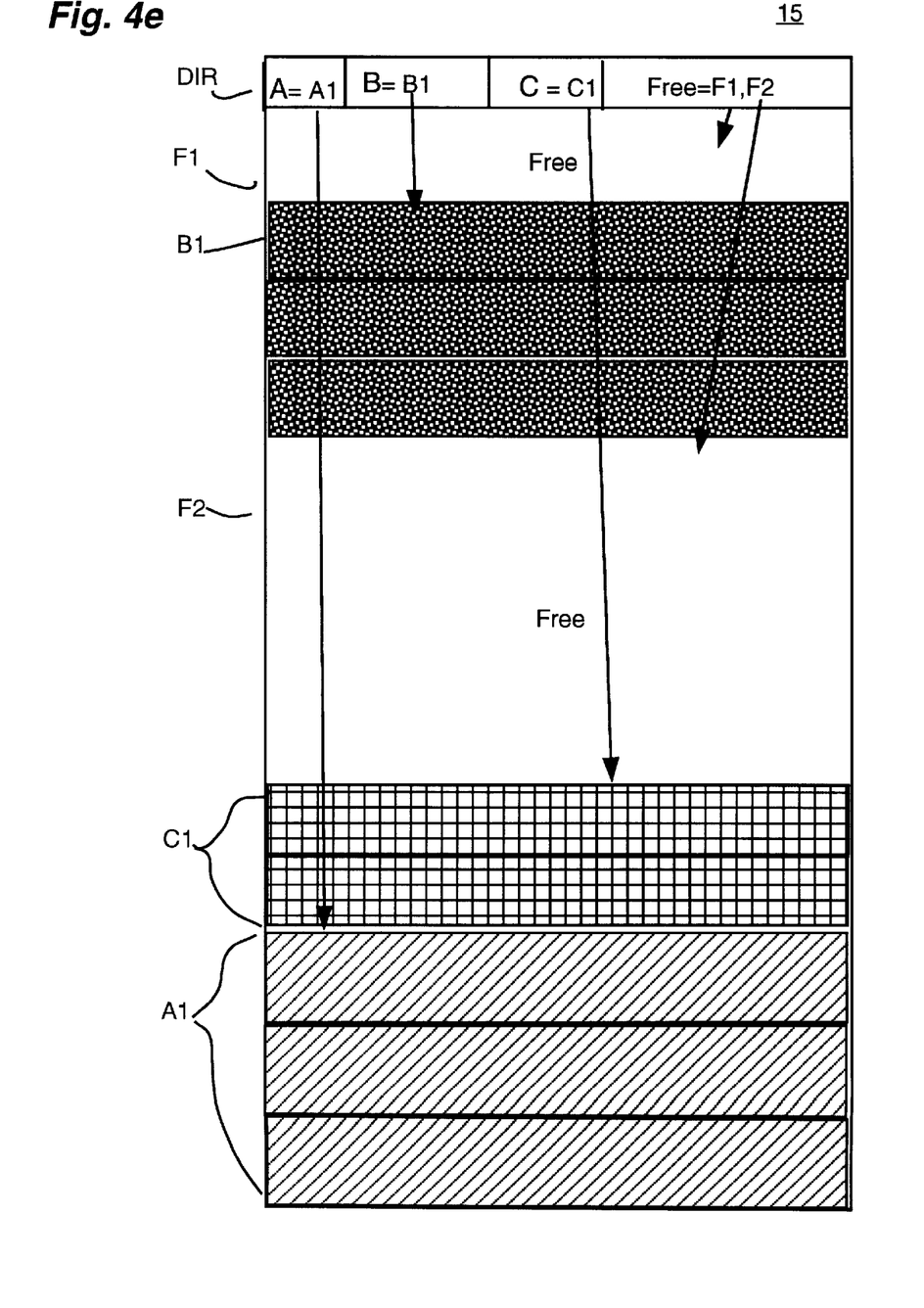
FIG. 4e is a schematic drawing of a disk with defragmented files.

At the end of a successful defragmentation of file A, the disk might look like the example shown in FIG. 4d, where the three original segments of file A have now been consolidated into one file with one extent. In FIG. 4d, it can be seen that disk 15 now has four free areas interspersed throughout the disk. If the remaining fragmented files on disk 15 were defragmented using the present invention, disk 15 might appear as shown in FIG. 4e, with files A, B and C defragmented.

As will be apparent to those skilled in the art, there are several ways in which copy function 20 could be implemented without deviating from the spirit of the invention. For example, rather than identify a fragment at a time and send that address in a copy command to copy function 20, defragmentation program 04 could identify all fragments and their addresses in one copy command, provided there is sufficient memory available to copy function 20 to store and queue these additional addresses. In the preferred embodiment diagrammed in FIG. 2, each fragment is copied without interim input/output data transfers between the disk control logic and host 00.

Referring back to FIG. 1b, now it can be seen that defragmentation program 04 could initiate defragmentation operations in each disk subsystem 30 attached to controller 07, so that all three disk subsystems 30 shown here could be executing a copy function 20 at the same time. Once a copy function has been initiated in a disk subsystem 30 as shown here, data transfers occur between control logic 10 and disk 15 internal to disk subsystem 30, thus leaving the other disk subsystems 30 free to perform normal input/output transactions. If two of the three disk subsystems 30 of FIG. 1b are executing copy functions 20 to defragment files, host 00 could have other programs executing and issuing ordinary input/output commands to the third disk subsystem 30 connected to controller 07.

Those skilled in the art will appreciate that when copy function 20 is placed in the control logic closest to each individual disk, as shown in FIGS. 1b and 3b, performance tends to be optimized, since copy function 20 allows each disk to undergo defragmentation without requiring significant data transfers over the controls between the disk 15 and host 00. In other words, if copy function 20 is embedded in control logic 10 as shown in FIG. 3*b* and control logic 10 has immediate control over disk 15, this should provide better overall performance for defragmentation operations.

By contrast, FIG. 1*g* illustrates a design where performance of defragmentation operations may be slower than that of FIG. 1*b*, since copy function 20 is embedded in the control logic "farthest" from disk 15 in conventional disk subsystem 31, namely in host director 08. As shown in FIG. 1*g*, there are several levels of control logic controlling disk subsystems 31—ranging from the most immediate control logic 10, (not visible in this view) to disk director 07 to host director 08. However, a placement such as this in host controller 08 allows the use of existing or conventional disk subsystems 31 and disk directors 07. The placement shown in FIG. 1*f*, where copy function 20 is embedded in the intermediate control logic of disk director 07, might provide performance benefits while still permitting the use of existing conventional disk subsystems 31.

In a preferred embodiment, copy function 20 would be implemented in hardware circuitry that forms part of the disk control logic component selected. As will be apparent to those skilled in the art, however, it could also be implemented in microcode or in software if the control logic component selected is fast enough to permit timely processing by the copy function.

Those skilled in the art will appreciate that the embodiments described above are illustrative only, and that other systems in the spirit of the teachings herein fall within the scope of the invention.

What is claimed is:

1. An apparatus for defragmenting a disk storage device in communication over a bus with a host computer employing operating system software, comprising:

a defragmentation program executing in the host computer and capable of determining the addresses of fragmented file segments and contiguous free areas located on the disk storage device and associating those addresses with commands;

at least one control logic controlling the disk storage device positioned external said host computer employing operating system software;

a copy function included in said control logic and responsive to commands associated with the addresses of fragmented file segments and contiguous free areas transmitted to the copy function by the defragmentation program over the bus, whereby the copy function copies the fragmented file segments on the disk storage device into contiguous free areas on the disk storage device without transferring the contents thereof over the bus to the host computer.

2. The apparatus of claim 1, wherein the copy function is included in the control logic having immediate control over the disk storage device.

3. The apparatus of claim 1, wherein the copy function is included in the control logic having intermediate control over the disk storage device.

4. The apparatus of claim 1, wherein the copy function is included in the control logic most removed from the disk storage device.

5. The apparatus of claim 1, wherein the copy function communicates with a buffer storage area.

6. The apparatus of claim 5, wherein the buffer storage area is located in the same control logic as the included copy function.

7. The apparatus of claim 5, wherein the buffer storage area is located in control logic apart from the control logic containing the copy function.

8. A method for defragmenting a disk storage device in communication over a bus with a host computer employing operating system software, comprising the steps of:

executing a defragmentation program in the host computer for determining the addresses of fragmented file segments and contiguous free areas located on the disk storage device and associating those addresses with commands;

responding, from a copy function included in at least one control logic, to commands associated with the addresses of fragmented file segments and contiguous free areas transmitted by the defragmentation program over the bus to the copy function, said control logic positioned external said host computer employing operating system software and controlling the disk storage devices so that the fragmented file segments on the disk storage device are copied into contiguous free areas on the disk storage device without transferring the contents thereof over the bus to the host computer.

9. The method of claim 8, wherein the step of responding to commands is done by a copy function included in the control logic having immediate control over the disk storage device.

10. The method of claim 8, wherein the step of responding to commands is done by a copy function included in the control logic having intermediate control over the disk storage device.

11. The method of claim 8, wherein the step of responding to commands is done by a copy function included in the control logic most removed from the disk storage device.

12. The method of claim 9, wherein the step of responding to commands is done by a copy function communicating with a buffer storage area.

13. The method of claim 12, wherein the step of responding to commands is done by a copy function communicating with a buffer storage area located in the same control logic as the included copy function.

14. The method of claim 12, wherein the step of responding to commands is done by a copy function communicating with a buffer storage area located in control logic apart from the control logic containing the copy function.

* * * * *